US012610262B2

(12) United States Patent
Kher

(10) Patent No.: US 12,610,262 B2
(45) Date of Patent: Apr. 21, 2026

(54) SITE STATUS DASHBOARD FOR 5G WIRELESS NETWORK

(71) Applicant: DISH Wireless L.L.C., Englewood, CO (US)

(72) Inventor: Pradipbhai Kher, Lewis Center, OH (US)

(73) Assignee: DISH Wireless L.L.C., Englewood, CO (US)

( * ) Notice: Subject to any disclaimer, the term of this patent is extended or adjusted under 35 U.S.C. 154(b) by 304 days.

(21) Appl. No.: 18/539,926

(22) Filed: Dec. 14, 2023

(65) Prior Publication Data

US 2025/0203443 A1     Jun. 19, 2025

(51) Int. Cl.

| | |
|---|---|
| *H04L 41/16* | (2022.01) |
| *H04L 41/22* | (2022.01) |
| *H04L 43/045* | (2022.01) |
| *H04L 43/067* | (2022.01) |
| *H04W 16/18* | (2009.01) |
| *H04W 16/22* | (2009.01) |
| *H04W 24/04* | (2009.01) |
| *H04W 24/10* | (2009.01) |
| *H04W 84/02* | (2009.01) |
| *H04W 88/08* | (2009.01) |

(Continued)

(52) U.S. Cl.
CPC ............. *H04W 24/04* (2013.01); *H04L 41/16* (2013.01); *H04L 41/22* (2013.01); *H04L 43/045* (2013.01); *H04L 43/067* (2013.01); *H04W 16/18* (2013.01); *H04W 16/22* (2013.01); *H04W 24/10* (2013.01); *H04W 84/02* (2013.01); *H04W 88/085* (2013.01);

*H04W 88/12* (2013.01); *H04W 88/18* (2013.01); *H04W 92/02* (2013.01); *H04W 92/12* (2013.01)

(58) Field of Classification Search
CPC ....... H04B 17/0082–409; H04L 5/0001–0098; H04L 41/02–5096; H04L 43/02–55; H04W 16/02–32; H04W 24/02–10; H04W 28/02–26; H04W 40/005–38; H04W 60/005–06; H04W 64/003–006; H04W 76/10–50; H04W 84/005–22; H04W 88/005–188; H04W 92/02–24
See application file for complete search history.

(56) References Cited

U.S. PATENT DOCUMENTS

| | | | |
|---|---|---|---|
| 2023/0319610 A1* | 10/2023 | Kasagi | H04W 24/08 |
| 2025/0202777 A1* | 6/2025 | Kher | H04L 41/16 |

* cited by examiner

*Primary Examiner* — Timothy J Weidner
(74) *Attorney, Agent, or Firm* — KW Law, LLP

(57) ABSTRACT

Systems, devices, and automated processes are described to provide collection of wireless network status data, such as for a 5G or other mobile network, and to automatically created user interactable dashboards providing various status information regarding the operation of the network. Systems and automated processes may obtain status data from a plurality of network components, for example radio units (RU), distributed units (DU), and centralized units (CU) associated with a cell sites, determine an operational state for each of the network components based on the obtained data, aggregate the determined operational states to determine an operational state of the cell sites, generate a dashboard having an indication of the operational states, provide the dashboard to a user interface, receive a user selection from the dashboard, and provide a report detailing the determined operational state.

20 Claims, 6 Drawing Sheets

(51) Int. Cl.

| | | |
|---|---|---|
| *H04W 88/12* | (2009.01) | |
| *H04W 88/18* | (2009.01) | |
| *H04W 92/02* | (2009.01) | |
| *H04W 92/12* | (2009.01) | |

| SITEID | CU STATUS | DU STATUS | RU STATUS | CSR STATUS | KPI STATUS | SLEEPY STATUS |
|--------|-----------|-----------|-----------|------------|------------|---------------|
| 123A | OK | -NOK- | OK | OK | OK | OK |
| 123B | -NOK- | OK | OK | -NOK- | OK | OK |
| 456A | OK | OK | -NOK- | OK | OK | OK |
| 789A | OK | OK | OK | OK | OK | -NOK- |
| 789B | -NOK- | -NOK- | OK | OK | OK | OK |
| 789C | OK | -NOK- | OK | OK | OK | OK |
| 456B | OK | -NOK- | OK | OK | OK | OK |

OVERALL STATUS

VIEW ALL

EXCEPTIONS ONLY

SEARCH:

400

420

440

450

430

410

SITE STATUS DASHBOARD FOR 5G WIRELESS NETWORK

TECHNICAL FIELD

The following generally relates to wireless data networks, such as 5G wireless networks. More particularly, the following relates to systems, devices, and automated processes to monitor network status and provide a comprehensive site status dashboard interface.

BACKGROUND

Wireless networks that transport digital data and telephone calls are becoming increasingly sophisticated. Currently, fifth generation ("5G") broadband cellular networks are being deployed around the world. These 5G networks use emerging technologies to support data and voice communications with millions, if not billions, of mobile phones, computers, and other devices. 5G technologies are capable of supplying much greater bandwidth than was previously available, so it is likely that the widespread deployment of 5G networks could radically expand the number of services available to customers.

Traditionally, data and telephone networks relied upon proprietary designs based upon very specialized hardware and dedicated point-to-point data connections. More recently, industry standards such as the Open Radio Access Network ("Open RAN" or "O-RAN") standard have been developed to describe interactions between the network and various client devices. The O-RAN model follows a virtualized wireless architecture in which 5G base stations ("gNBs") are implemented using separate centralized units (CUs), distributed units (DUs) and radio units (RUs), along with various control planes that provide additional network functions (e.g., 5G Core, IMS, OSS/BSS/IT). Generally speaking, it is still necessary to implement the RUs with physical transmitters, antennas, routers, and other hardware located onsite within broadcast range of the end user's device.

Other components of the network, however, can be implemented using a more centralized architecture based upon cloud-based computing resources, such as those available from Amazon Web Services (AWS) or the like. This provides much better network management, scalability, reliability and redundancy, as well as other benefits. O-RAN CUs, DUs, control planes and/or other components of the network can now be implemented as software modules executed by distributed (e.g., "cloud") computing hardware. Other network functions such as access control, message routing, security, billing and the like can similarly be implemented using centralized cloud computing resources. Often, a CU, DU, control plane or other image is created in software for execution by one or more virtual computers operating in parallel within the cloud environment. The many virtual servers can be very rapidly scaled to increase or decrease the available computing capacity as needed.

The use of virtualized hardware provides numerous benefits in terms of rapid deployment and scalability, but it also presents certain technical challenges that have not been encountered in more traditional wireless networks. Unlike traditional wireless networks that scaled through the addition of physical routers, switches and other hardware, RAN networks can scale upwardly and downwardly very quickly as new cloud-based services are deployed and/or existing services are retired or redeployed. Additional network components can be very quickly deployed, for example, through the use of virtual components executing in a cloud environment that can be very quickly duplicated and spawned as needed to support increased demand. Similarly, virtual components can be de-commissioned very quickly with very little cost or effort when network capacity allows. The virtual components provide substantial efficiencies, especially when compared to prior networks that were based upon complex interconnections between geographically dispersed routers, servers and the like.

The flexibility and rapid variability of such networks leads to a large (but possibly constantly changing) amount of available status data corresponding to the operation of the various network components, the network as a whole, and the like. Maintaining an up-to-date summary of network status, for example a report including predefined fields, status of individual components, and the like, becomes difficult with the amount of available data and its changeability. Given the complexity of such networks, dashboard summaries can rapidly become out of date or otherwise inaccurate, leading to missed opportunities to correct network behavior, quickly fix cell site issues, and the like. Further, when there is an issue with a network component, it can be difficult to quickly identify the root cause of the issue. High availability is required for each cell site and the network to minimize data and voice service interruptions, so it is desirable to more accurately determine the status of the network and provide more accurate and insightful dashboards, reports, and the like.

One technical challenge that arises in the new networks, therefore, involves monitoring the status, performance, and connectivity of the networks. Network components can be commissioned and de-commissioned very rapidly, and conditions can evolve very quickly in various parts of the network. Tracking the performance, status, and connectivity of a large-scale RAN network can therefore be very difficult due to the scale of resources involved and the dynamic nature of such networks.

As new networks are developed and deployed, then, substantial challenges arise in tracking the performance and connectivity of the network and its many distributed components. A substantial desire therefore exists to build systems, devices and automated processes that allow for monitoring and control of emerging 5G wireless networks. These and other features are described in increasing detail below.

BRIEF SUMMARY

Various embodiments relate to systems, devices, and automated processes to provide status data management and provide dashboards relating to network status and/or other summaries of obtained status data, which may be responsive to a user selection of certain network status indicators to provide additional information relating to the selected network status, and the like. According to various embodiments, systems and automated processes may automatically collect various status data, process it according to thresholds, limits, machine learning models, time series analysis, or the like, store the obtained status data and processed status data, generate a status dashboard, receive a user selection based on the dashboard, and generate an updated display based on the user selection. The systems and automated processes may provide dashboards, reports, alerts, or other information about the state of the network, one or more cell sites, network components, or the like.

In various embodiments, an automated process may be performed by a data management system associated with a wireless network having a plurality of network components associated with a plurality of cell sites, the data management system comprising a processor and an interface to the wireless network, the automated process comprising: obtaining, via the network interface, a plurality of sets of status data wherein each set of status data corresponds to one of the plurality of network components, and wherein the plurality of network components comprises at least one each of a radio unit (RU), a distributed unit (DU), and a centralized unit (CU) associated with each of the plurality of cell sites; determining an operational state for each of the plurality of network components based on the corresponding status data set; aggregating each determined operational state associated with a first cell site of the plurality of cell sites to determine an operational state of the first cell site; generating a dashboard comprising an indication of the operational state of the first cell site and an indication for each network component associated with the first cell site; providing the dashboard to a user interface; receiving a user selection corresponding to one of the determined operational states via the user interface; and providing a report comprising details regarding the determined operational state.

Still other embodiments provide a data management system comprising a processor, non-transitory storage, and an interface to a wireless network having a plurality of network components associated with a plurality of cell sites, wherein the non-transitory storage comprises computer-executable instructions that, when executed by the processor, perform an automated process that comprises: obtaining, via the network interface, a plurality of sets of status data wherein each set of status data corresponds to one of the plurality of network components, and wherein the plurality of network components comprises at least one each of a radio unit (RU), a distributed unit (DU), and a centralized unit (CU) associated with each of the plurality of cell sites; determining an operational state for each of the plurality of network components based on the corresponding status data set; aggregating each determined operational state associated with a first cell site of the plurality of cell sites to determine an operational state of the first cell site; generating a dashboard comprising an indication of the operational state of the first cell site and an indication for each network component associated with the first cell site; providing the dashboard to a user interface; receiving a user selection corresponding to one of the determined operational states via the user interface; and providing a report comprising details regarding the determined operational state.

Still other embodiments provide an automated process performed by a data management system associated with a wireless network having a plurality of network components associated with a plurality of cell sites, the data management system comprising a processor and an interface to the wireless network, the automated process comprising: obtaining, via the network interface, a plurality of sets of status data wherein each set of status data corresponds to one of the plurality of network components, and wherein the plurality of network components comprises at least one each of a radio unit (RU), a distributed unit (DU), and a centralized unit (CU) associated with each of the plurality of cell sites; aggregating, for each cell site of the plurality of cell sites, a subset of the plurality of sets of status data associated with the respective cell site; determining, based on the aggregated subsets of status data, an operational state of each of the plurality of cell sites; generating a dashboard comprising an indication of the operational state of each of the plurality of cell sites; providing the dashboard to a user interface; receiving a user selection corresponding to one of the determined operational states via the user interface; and providing a report comprising details regarding the determined operational state.

These and other example embodiments are described in increasing detail below.

BRIEF DESCRIPTION OF DRAWING FIGURES

DETAILED DESCRIPTION

Figure 1:
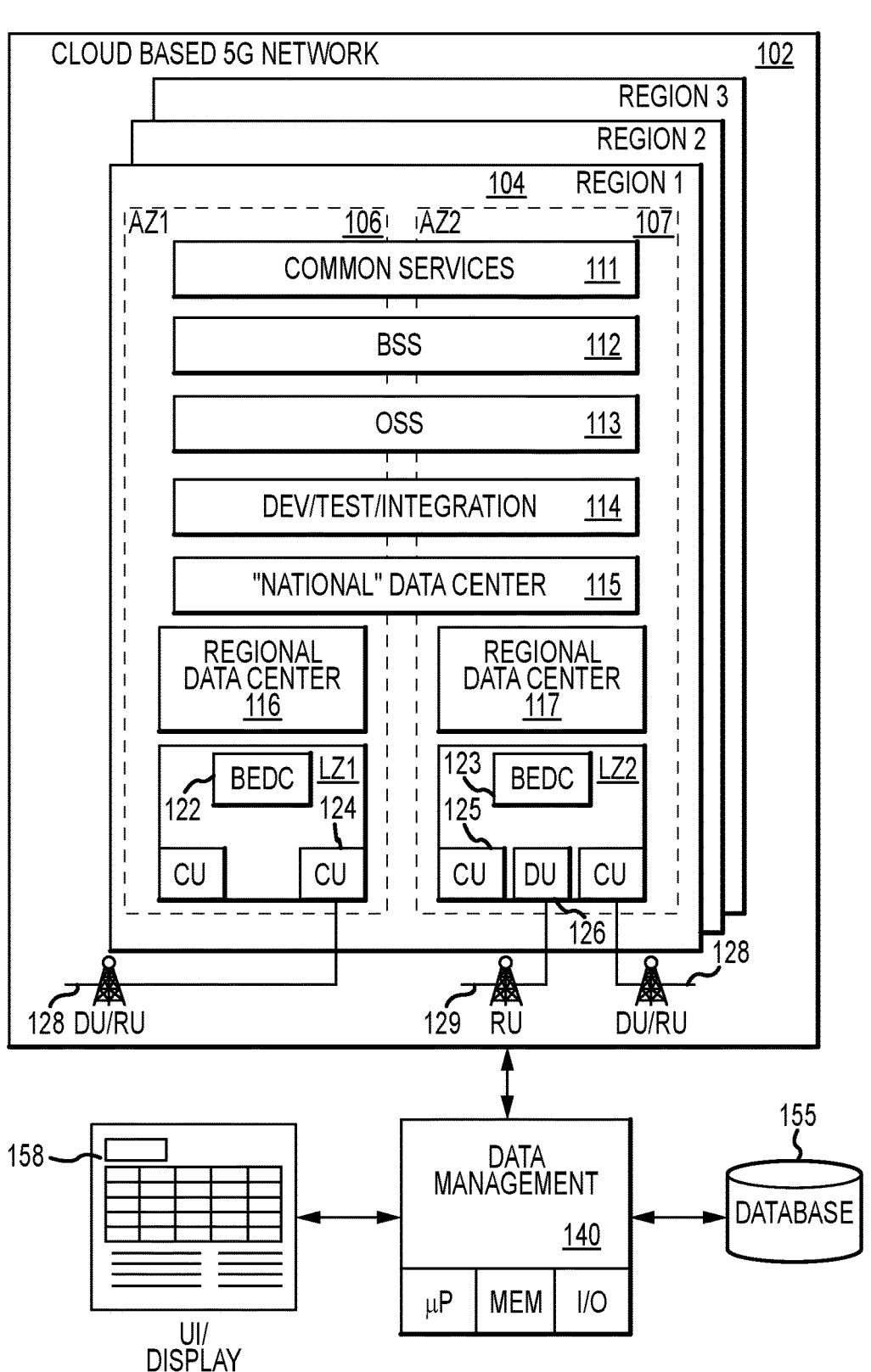
FIG. 1 shows an example of a 5G wireless network that is implemented with a cloud-based computing system.

The following detailed description is intended to provide several examples that will illustrate the broader concepts that are set forth herein, but it is not intended to limit the invention or the application and uses of the invention. Furthermore, there is no intention to be bound by any theory presented in the preceding background or the following detailed description.

According to various embodiments, a data management system obtains operating or other performance data relating to the various modules of a RAN-based mobile network system. The data management system can be configured to receive streaming data that may be available from one or more data sources. Alternately and/or additionally, the data management system can place queries to other sources of data. Data received via query and/or streams can be filtered, formatted, tagged with metadata and/or otherwise processed into a format suitable for processing by the data management system. The data management system may process the received data using one or more algorithms, checks, thresholds, limits, time series analysis, machine learning models, or the like, and may store the processed and unprocessed data for later user. The data management system may analyze the received data to determine the status of components of one or more cell sites as well as the status of each cell site. The data management system may additionally create an interactive dashboard or other reports for evaluation by humans and/or by other automated processes based upon the determined status data.

Using a data management system accordingly allows for real time (or near real-time, accounting for some delays inherent in processing, data communications and the like) monitoring and management of a 5G wireless network in a manner that was not previously thought to be possible. The use of a data management system also provides for rapid adaptation to dynamic cloud-based systems, providing flexibility with accuracy in the summaries produced by the data management system, and providing faster responses and thereby allowing reduction in operating costs of the network.

The automated processes and systems may leverage information available from a virtualized network management system such as an operational support system (OSS), element management system (EMS), and the like. Use of the automated processes and systems described herein allows for real time (or near real time) monitoring of the status of the health of the network, each of plurality of cell sites of the network, other network components, and the like in a manner not previously possible. Use of the automated processes and systems described herein further allows for detailed, configurable, customizable, and interactive reports corresponding to network-related issues in a manner not previously possible. The use of the status summary systems and methods allows deeper insights into the network and cell site status, for a more complete view and efficient identification, analysis, and correction of issues in the network. The status summary systems and methods described herein result in higher network uptime and facilitate meeting quality of service and other goals.

With reference to FIG. 1, a 5G wireless network 102 can be implemented using cloud-based computing resources, such as those available from Amazon Web Services Inc. (AWS) of Seattle, Washington. Other cloud services are available from Microsoft Corp. of Redmond, Washington, IBM Corp. of Armonk, New York, and others. In the example of FIG. 1, network 102 encompasses data processing services supporting multiple regions 104, each having one or more availability zones (AZs) 106, 107 each acting as a separate data center with its own redundant power, network connectivity and other resources as desired. In some implementations, the various AZs operating within the same region will provide redundancy in the event that another AZ would fail, become overloaded, or otherwise become unavailable.

The example of FIG. 1 illustrates three regions, with region 104 having two AZs 106, 107, although other embodiments could include any number of regions and AZs providing any number of services and resources. The regions and zones are often described herein with reference to geographic locations, but in practice the regions and zones could be equivalently organized based upon customer density, user density, expected network demand, availability of electric power and/or bandwidth, and/or any other factors. As noted above, it will still be necessary to deploy radio units (RUs) within broadcast range of end users. By implementing the other functions of the network using virtualized hardware operating within a cloud-type architecture, geographic restrictions upon the network 102 can be greatly reduced. This can provide substantial efficiencies in deployment and expansion of network 102, while also allowing for more efficient use of computing resources, data storage and electric power. However, particular arrangements, operational parameters, and performance requirements of each cell site and the various components of the network 102 might be required to support such efficiencies.

In example system 100, a network operator maintains ownership of one or more radio units (RUs) located at wireless network cell sites 128, 129. Each RU suitably communicates with user equipment (UE) operating within a geographic area of its respective cell site using one or more antennas/towers capable of transmitting and receiving messages within an assigned spectrum of electromagnetic bandwidth (which may also be referred to herein as a "spectrum band" or "frequency band"). In various embodiments, the assigned spectrum may be allocated across one or more guest networks to support multiple concurrent networks, if desired.

The Open RAN standard breaks communications into three main domains: the radio unit (RU) that handles radio frequency (RF) and lower physical layer functions of the radio protocol stack, including beamforming; the distributed unit (DU) that handles higher physical access layer, media access (MAC) layer and radio link control (RLC) functions; and the centralized unit (CU) that performs higher level functions, including quality of service (QOS) routing and the like. The CU also supports packet data convergence protocol (PDCP), service data adaptation protocol (SDAP) and radio resource controller (RRC) functions. The RU, DU and CU functions are described in more detail in the Open RAN standards, as updated from time to time, and may be modified as desired to implement the various functions and features described herein.

In the example illustrated in FIG. 1, common services (e.g., billing, guest network allocation, etc.) can be performed in a shared service 111 across the available AZs 106, 107. Typically, these shared services will be implemented within a common virtual private cloud (VPC) operating within the cloud environment. Similarly, shared VPC systems can support business support system (BSS) 112, operational support services (also referred to as operating support system or OSS) 113, development/test/integration features 114, and/or the like across the entire region. A region wide data center (identified as a "national" data center 115 in FIG. 1) could be implemented in a shared VPC across AZs 106, 107, if desired, with subordinate data centers (e.g., "regional" data centers 116, 117) being separated into different VPCs for each of the AZs 106, 107. Additional levels of data centers could be provided, if desired, and/or the different data center functions could be differently organized in any number of equivalent embodiments. The various data centers could provide any number of services such as IP multimedia services (IMS), 5G core services and/or the like.

In the example of FIG. 1, each AZ 106, 107 includes one or more breakout edge data centers (BEDCs) 122, 123 each supporting a local zone (LZ, such as LZ1 or LZ2 in FIG. 1) with one or more cell sites. The BEDCs are ideally organized for very low latency to provide best possible throughput and low latency to the various user equipment operating within the local zone. BEDCs 122, 123 will typically implement one or more CUs 124, 125 in accordance with the O-RAN specifications. BEDCs may also implement user plane functions that handle user data sessions for gaming, streaming and other network services, as desired. Again, any number of BEDCs and other data centers may be implemented using any number of different or shared VPCs in the cloud environment, as desired. The DUs 126 may be provided physically at the cell site 128, 129 or may be remote from the cell site, for example provided by the local zone (e.g., LZ1, LZ2), or any combination thereof depending on each cell site 128, 129. Accordingly, the DU may comprise physical hardware located at a cell site 128, 129 or remote from a cell site, or may comprise virtualized resources as described above.

As noted above, many of the various network components shown in FIG. 1 can be implemented using software or firmware instructions that are stored in a non-transitory data storage (e.g., a disk drive or solid-state memory) for execution by one or more processors within the VPC. VPCs may provide any number of additional features to support the data handling functions of the system, including redundancy, scalability, backup, key management, reporting, and/or the like.

In some embodiments, the OSS 113 may comprise or otherwise be in communication with an element management system (EMS) configured to manage the network elements (or components) of the system 100. In some embodiments, the EMS can manage a network component or a group of similar network components, for example configuring, reading alarms, obtaining status and other reported information, or the like for a group of network components. For example, the EMS may implement fault, configuration, accounting, performance, and/or security functions. The EMS may interface with the OSS 113, for example to manage inventory, faults, and configuration. The OSS 113 may interface with one or more EMSs. The EMS may also interface with the various components of the network, for example to manage and/or configure DUs and RUs. The EMS and OSS 113 therefore support deployment of new services, monitoring performance and faults, and meeting quality of service requirements, among other functions. The EMS and OSS may collectively be referred to herein as the OSS 113. In embodiments without a dedicated EMS, the OSS 113 or other similar management programs may perform the functions described above, which again shall be referred to as OSS 113 herein.

Each RU of a cell site 128, 129 may be associated with a different wireless cell that provides wireless data communications to any number of user devices operating within broadcast range of the cell. For example, a cell site 128, 129 may have antennas arranged to serve three sectors of 120-degree coverage each (e.g., one sector per cell), six sectors of 60 degrees each, or any other suitable arrangement, with each such antenna communicatively coupled with an RU for that sector or cell. Each sector may form separate pie-shaped arcs that, combined, form a circle of 360-degree coverage around the cell site. Each sector may be part of a separate cell (e.g., as is common in a three-sector configuration), or multiple sectors may share the same cell (depending on cell site configuration).

As described above, 5G networks such as network 102 may be continually and rapidly expanding and evolving, and a large number of cell sites may require initial setup and ongoing maintenance. Setting up and maintaining numerous cell sites may be facilitated by standardizing or otherwise prescribing how the cell sites are to be set up. For example, a particular cell site or type of cell site may have a predetermined configuration including number and model of RUs, cell cite routers (CSRs), antennas, and the like, and may include how such components are to be communicatively coupled. Further, the configuration may assign each RU (e.g., identified by serial number, MAC address, or the like) to a specific sector, spectrum band(s), port connection on the CSR, IP address, and the like.

An RU may transmit, receive, amplify, and digitize radio frequency signals, and may be integrated with one or more antennas or may be separate from but communicatively coupled with one or more antennas of the cell site. RUs may be implemented with radios, filters, amplifiers and other telecommunications hardware to transmit and receive digital data streams via one or more antennas. Generally, RU hardware includes one or more processors, non-transitory data storage (e.g., a hard drive or solid-state memory) and appropriate interfaces to perform the various functions described herein. RUs are physically located on-site with the transmitter/antenna, as appropriate. Conventional 5G networks may make use of any number of wireless cells spread across any geographic area, each supported by an on-site RU. In some embodiments, the cell site comprises one RU per sector, and if the cell site is multi-band then it may comprise one RU per band per sector.

User devices are often mobile phones or other portable devices that can move between different cells associated with the different RUs, although 5G networks are also widely expected to support home and office computing, industrial computing, robotics, Internet-of-Things (IoT) and many other devices. Therefore, many configurations, operational requirements, performance metrics, and the like may be required. While the example illustrated in FIG. 1 shows just a few cell sites 128, 129 for convenience, a practical implementation will typically have any number of cell sites that can each be individually configured, including the RUs at the cell sites, to provide highly configurable geographic coverage for the 5G network 102. Further, the cell sites 128, 129 can be configured for any combination of spectrum bands. For 5G networks, the low band (LB) spectrum may comprise frequencies less than 1 GHZ, the mid band (MB) spectrum may comprise frequencies from 1 GHz to 6 GHZ, and the high band (HB) may comprise frequencies from 24 GHz to 40 GHz. For example, some cell sites may operate at a single spectrum band, and some cell sites may operate at multiple bands ("multi-band") such as LB and MB. The respective RUs and antennas may be configured to support the assigned spectrum band(s).

Figure 2A:
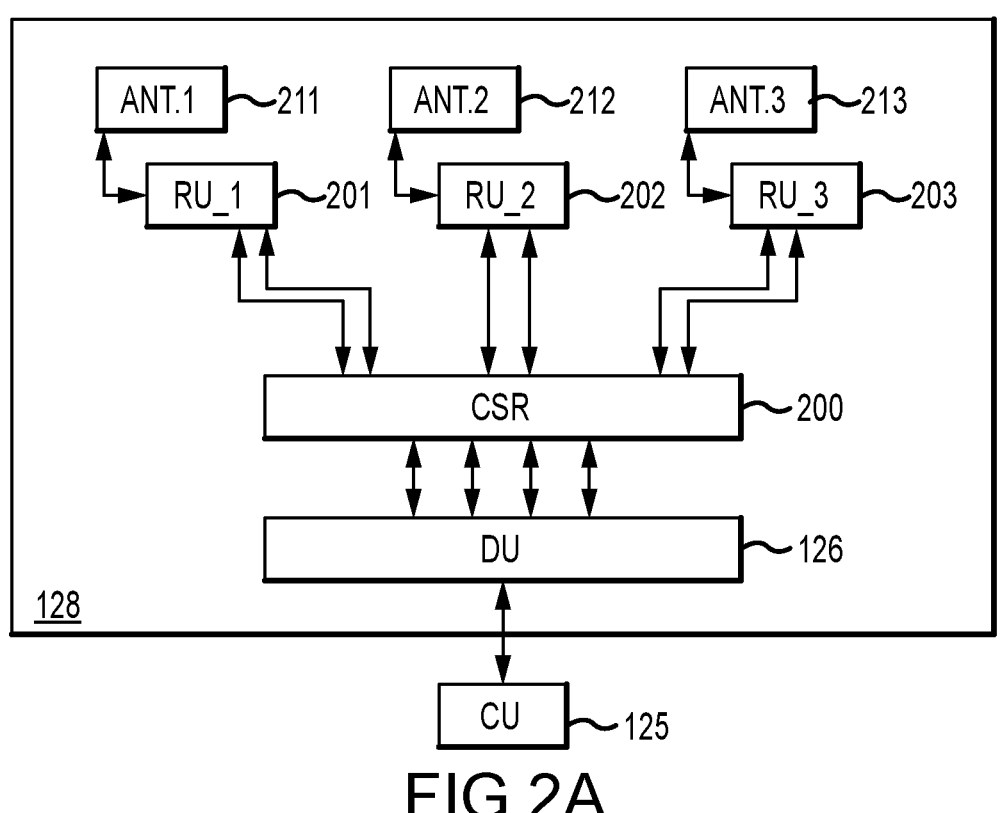
FIG. 2A is a block diagram illustrating a first exemplary arrangement of components associated with a cell site of the 5G wireless network.
Figure 2B:
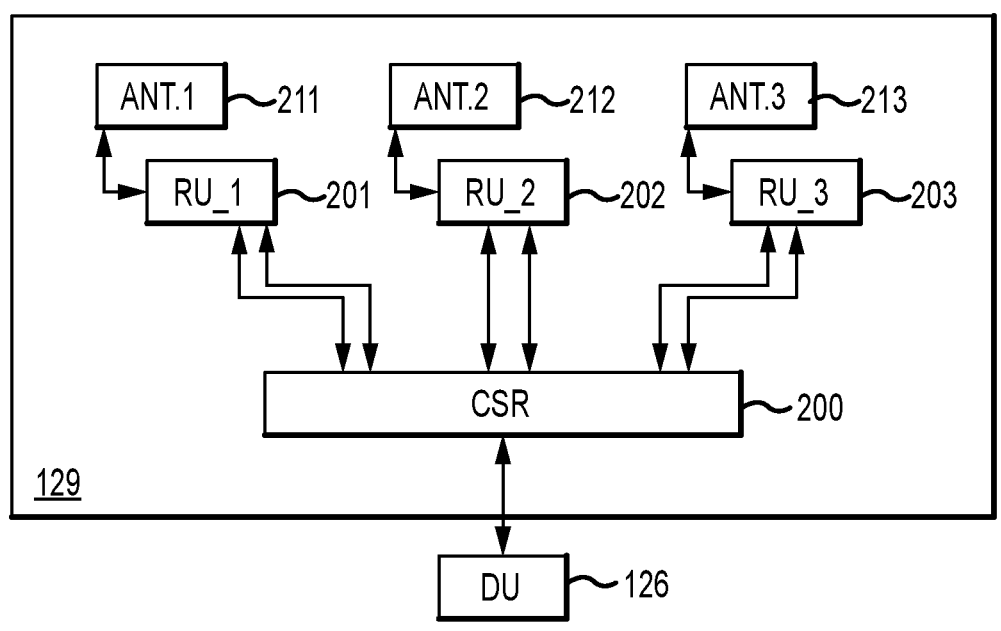
FIG. 2B is a block diagram illustrating a second exemplary arrangement of components associated with a cell site.

Briefly referring to FIGS. 2A and 2B, cell sites 128, 129 may be configured in a number of suitable arrangements. Referring to FIG. 2A, for example, a cell site 128 may comprise a cell site router (CSR) 200, a DU 126, one or more RUs 201, 202, 203, and one or more antennas 211, 212, 213. Each RU 201, 202, 203 may be electrically coupled with antennas 211, 212, 213, respectively. Each connected group of RU and antenna may serve a cell sector. For example, a first RU 201 coupled with a first antenna 211 may serve a first sector, a second RU 202 coupled with a second antenna 212 may serve a second sector, and a third RU 203 coupled with a third antenna 213 may serve a third sector. Further, each such RU-antenna group may serve the respective sector in one or more spectrum bands, e.g., LB, MB, HB, or any combination thereof. Specific RUs 201, 202, 203 (e.g., identified by serial number, MAC address, RU label, or the like) and specific antenna types (e.g., identified by model number) may be assigned to specific sectors and spectrum bands.

The RU 201, 202, 203, CSR 200, and in some cases the DU 126 may be in a local area network (LAN) configuration. The LAN configuration may comprise, for example, an Ethernet-based network, and may comprise wired connections, fiber optic connections, and/or the like between the various components. The CSR 200 may have input/output connections (e.g., ports) for multiple RUs 201, 202, 203 and one or more DU 126.

The CSR 200 may function as a network router and may aggregate the cell data traffic from the cell site 128, 129 and transmit the aggregated data to the network 102, for example via the DU 126. The CSR 200 may be communicatively coupled with the one or more RUs 201, 202, 203 and one or more CUs 125 via the CSR 200 ports. The CSR 200 can associate each port with an IP address, MAC address, and other desired information.

The network 102, for example the data management system 140, may access the CSR 200 to obtain this information. In some embodiments, the data management system 140 may send an instruction to the CSR 200 to request information about the current state of the interface (e.g., ports) of the CSR 200. The CSR may reply with information regarding each port and connected devices, including port identifiers, IP addresses, status, and the like. The network 102, for example the data management system 140, may similarly access each RU 201, 202, 203, for example via the CSR 200, to obtain relevant information. In various embodiments, the RUs 201, 202, 203, DU 126, CSR 200, and data management system 140 are communicatively coupled (e.g., via hardware or software interface) with the OSS 113.

Each DU 126 may support multiple cells or cell sites, and the CSR 200 may be communicatively coupled with one or more DUs 125. In some embodiments, referring still to FIG. 2A, the DU 126 may be located at the cell site 128. Referring to FIG. 2B, in another example, the DU 126 may be located external to the cell site 129, for example implemented via cloud computing, for example at a local zone, with the connections between DU 126, CSR 200, RUs 201, 202, 203, and antennas 211, 212, 213 being as described above.

Referring again to FIG. 1, in various embodiments the information (e.g., status data) obtained by the data management system 140 from the RUs 201, 202, 203, DU 126, CU 125, CSR 200, OSS 113, and/or other network components, is at least temporarily stored in a database 155 or other storage available to data management system 140 for subsequent processing. The data can also be formatted, as desired, so that data received from different sources can be collectively processed and used in the determination and reporting functions described below. Generally speaking, some embodiments will place received data into a relatively consistent format that can be analyzed and processed by the data management system 140 to permit dashboards, alerts, and reports (each of which may be represented in FIG. 1 by the UI/display 158) to be generated by a common system from different types of data that have been collected about the network 102. The data management system 140, as described in more detail below, may store processed status data in the database 155.

In various embodiments, the data received from the various data sources is automatically tagged with metadata or other information about the data source, the method of collection, dates and/or times of collection, and/or any other information that may be desired. The tagging and metadata may also be considered status data. Tagging may be performed by associating the data values with other relevant information within an extensible markup language (XML) structure, a JavaScript object notation (JSON) structure and/or any other format desired. Reports may be generated in response to user selections received via an API, web browser interface or other user interface, for example via the UI/display 158, or the like, as desired. Dashboards may be generated for real time presentation to monitor current status of the network 102 and/or its components.

It is generally desired to monitor the status of the network 102. As noted above, the various components of the network 102 can be implemented using virtual private clouds (VPC) or other virtual hardware components, dedicated hardware, or configured general purpose hardware, among others. Each of these components will typically produce data during operation that indicates status, performance, capacity, issues and/or any number of other parameters. The many individual network components, for example RUs, antennas, cell site routers (CSRs), DUs, and CUs, may provide status, identification (e.g., serial number, MAC address, associated cell site, etc.), configuration, performance, capacity, and/or any number of other parameters (collectively, including from the VPCs, referred to herein as status data). Status data may be queried, streamed, or otherwise obtained from the network 102, and may be live data, raw data, formatted or unformatted, or the like. Status data may further include information required for sleepy cell detection, the output of such sleepy cell detection, key performance indicators (KPI) such as those defined for 5G networks, and the like. A sleepy (or sleeping) cell is a cell site that is not generating any alarms or alerts but has otherwise stopped accepting cellular traffic. The defined KPIs can, for example, be measured at different locations within the network.

In some cases, it is necessary to monitor over 150, and in some cases multiple hundreds or thousands, of status data fields, to determine and monitor the operational condition of the network 102 and identify any issues with the network 102. The large amount of data produced by the various modules and components can be processed to generate status dashboards, alerts, notifications, and/or other reports 158 that may be viewed and interacted with by an operator or other user of the network system 100. The large amount of data can be processed to support user or automated review of the status of various aspects or components of the network 102. Status data can also be used to adjust the configuration or operation of the network, as desired. By processing and managing data produced by and/or corresponding to the various components of network 102, then, the status and performance of the network can be monitored, adjusted, and corrected as desired.

In some embodiments, status data may include information provided with health checks (HC) or other reports sent by or requested from the RUs, DUs 126, CUs 124, 125, and/or the like. For example, health check information may include specific items such as N3 ping status, pod status, el_ap_status, sctp_status, tx/rx power, flc status, vm status, prach_status, cell admin/operational status, and the like. Health check information may be specific to a particular vendor of the relevant equipment and/or operating environment (whether hardware or software), the type or model number of such equipment and/or environment, a particular configuration of such equipment and/or environment, or the like. In some embodiments, status data may include information provided by the CSR (e.g., from an interface status request), by the systems operating the region(s) 104, availability zone(s) AZ1, AZ2, data centers 115, 116, 117, BEDCs 122, 123, local zones LZ1, LZ2, and the like.

In some embodiments, status data may include KPIs. Such status data may include data specific to a particular network 102 component, may include data corresponding to a group of components (e.g., delay and latency between two or more components, etc.), may include data corresponding to the network as a whole, and the like. KPIs may include a variety of performance indicators, for example latency, jitter, availability, packet loss, area capacity, user data rate, component onboarding, configuration, and deployment times, slice creation time, component scaling time, signal/noise data, and many others. KPIs may include data accessibility and retainability, handover success, rrc connection reestablishment, VONR accessibility and retainability, and/or other measures of user experience on the network 102. KPIs may be obtained from a variety of sources, for example depending on the vendor of the particular equipment and/or virtualized operating environment of the network 102. For example, KPIs may be provided by the OSS 113, by a separate tool provided by a vendor of the OSS 113, other system of the network 102, and the like. KPIs may be vendor and/or standard specific.

In some embodiments, status data may include other parameters and various types of electronic documents. For example, status data may include site closeout package documentation corresponding to a completed cell site, including for example floor plans, component settings at time of install, test results from installation, equipment list, serial numbers, software/hardware revisions, power up data, GPS data, antenna setup details, other configuration information, and the like. Documentation may be in any suitable format, for example Portable Document Format, text file, comma-separated value list, HTML, XML, and the like.

The parameters may be separate from the HC (reports), KPIs, and electronic documentation, and may comprise network configurations that tell a UE and a cell site how to behave, when to handover, if the site is not allowed for commercial use, max power, when to do carrier aggregation, when to reselect to a new cell, how long to wait before triggering certain events, where to send random access requests (in terms of frequency and time resources, etc.), and so on. Parameters may be vendor and/or standard specific, and some specific examples of parameters may include rsrp (for example eventa3), hysteresis, qrxlevel Minimum, qRx-LevMinOffsetCell, prachPreamble format, timetotrigger (for example eventa3 and a5), sNonintra search threshold (i.e., inter frequency measurement threshold), cell reselection priority, cellbar state, cell reservation state, and so on. There can be thousands of parameters controlling the behavior of a cell site, the network, and the UE.

In various embodiments, a data management system 140 may be provided to collect and process raw or processed status data from one or more of the components of network 102, for example from the RUs, DUs 126, CUs 124, 125, OSS 113, CSRs, and the like, in addition to the KPIs, parameters, documentation, and the like. Data may be obtained by querying the components, receiving a data stream from the components (e.g., in real-time or near real-time), or any other suitable method or combination of methods. In some embodiments, the data management system 140 may obtain status data for the network 102 components indirectly, for example via a support system such as the OSS 113, BSS 112, or other data collection/aggregation systems and/or processes. In some embodiments, the data management system 140 may obtain status data related to UE devices (e.g., performance related information), for example directly from UE devices and/or derived from communication between the UE devices and the network 102, or otherwise provided by the UE to the network 102. The data management system 140 may obtain relevant status data from other suitable sources internal or external to the network 102.

Any number of streaming and/or query-based data sources may be deployed within the network 102. Streaming data may be particularly useful for network 102 components that generate substantial amounts of real-time data (e.g., performance measurements, etc.). For example, DU and CU modules of network 102, in particular, provide substantial amounts of real-time data. Generally speaking, data handled by query-based sources tend to be less reliant upon real-time delivery for status updates or the like. Log data, fault metrics, performance metrics and other types of time-series data may be particularly well-suited for query-type collection.

The data management system 140 may be implemented using any sort of computing hardware, such as any sort of processor (UP), memory or other non-transitory data storage and input/output (I/O) interfaces for data communications and/or the like. The data management system 140 may comprise an interface (e.g., I/O) to the network 102, for example via wired or wireless networking, application programming interface (API) calls within a software operating environment, virtualized connections, or the like, by which it can collect the various data from the network 102 as described herein. The data management system 140 may comprise an interface external to the network 102, for example to collect status data relevant to the network 102 but from external to the network 102 (e.g., map data, UE device information, weather information, or the like). In various embodiments, hardware is abstracted by virtual computing resources available from AWS or another cloud computing platform.

In some embodiments, the data management system 140 may be implemented via program instructions configured to run on a computing device (implemented with conventional hardware, virtualized hardware, and/or cloud-based resources as desired) such as a computer server that queries the monitored components according to any desired time schedule to receive data, queries the monitored components on demand, receives data stream from the monitored components, or the like. The data received by the data management system 140 may be locally cached or otherwise stored in any sort of non-transitory memory (e.g., solid state memory, magnetic or optical memory, cloud-based sources, and/or the like) for subsequent retrieval and processing as desired and as described herein. Each monitored component may be internally configured to write its output/log data to data management system 140, as desired.

The data management system 140 may communicate with the monitored components directly and/or through one or more intermediary components or data sources to obtain the desired data. The data management system 140 may format and/or filter the obtained data as appropriate, and forward and/or store the collected and possibly processed data for reporting and/or any other further processing as desired. In various embodiments, the data management system 140 may receive data in one or more formats, may append source and/or service location (e.g., cell site, sector, spectrum band) information as tags or the like, and may push and/or store the tagged data for further processing, display, or the like (using, e.g., HTTP structures or the like). In some embodiments, the data management system 140 may process, format, and/or forward the obtained data for presentation via a dashboard 158, response to a user selection, web interface, alert system, and the like. Some embodiments may also filter the received data as desired to remove unwanted or unnecessary data that would otherwise consume excess storage or require additional processing. Other embodiments may perform additional monitoring, as needed.

In some embodiments, for example, the data management system 140 may obtain status data from the OSS 113, for example collecting, for each RU at a cell site, an assigned site and sector identifier, a serial number, administrative state, operational state, status information, cell state, a label for the RU (e.g., identifying the cell site, spectrum band, and sector the RU is intended to cover), IP address, tilt and other configuration and identifying information (e.g., serial number) for an antenna to be coupled with the RU, other identifying or model information for the RU, coupled antennas, or cell site, and the like. Similar or other status data may be obtained for the DU, CU, CSR, or any other network 102 component or related device (e.g., UE), and may be stored by the data management system 140.

In various embodiments, the data management system 140 stores received data in a database 155 or other data structure for later retrieval, as desired. The data management system 140 can process the status data as described herein and store the processed data in the database 155. The database 155 may comprise any suitable data store, for example a relational database, vector database (also referred to as a vector store), graph database, unstructured database, spreadsheet, combination of database types, or the like. The database 155 may comprise an embedded knowledge base, for example embedded according to a machine learning model. The knowledge base may be created and updated according to status data.

The data management system 140 may also provide reports to human and/or automated reviewers. One or more dashboards may be presented on any display 158, for example comprising a user interface (UI). The display 158, for example via a suitable user interface, may also receive data and queries (e.g., in the form of a user selection of a displayed status data field) from a user. Reports can be used to monitor the status of network 102, to determine the configuration or operation of network 102 (or any component thereof), and/or for any other purpose. The data management system 140 may further provide real-time alerts (e.g., via email, text message or the like) to human operators if certain events are detected, such as outages, shutdowns, security breaches and/or the like. Other embodiments could implement the various functions and components described herein in any number of equivalent arrangements.

In operation, then, data management system 140 suitably obtains status data from or related to one or more components of a 5G wireless network operating within a cloud-based computing environment. The data can be obtained directly from the component, via intervening data source systems that aggregate data from multiple data sources within the network 102, or the like. Collected data can be tagged, filtered, and/or processed as desired, and the original and/or processed status data is stored in the database 155 for reporting, dashboards, user inquiries, and/or other actions as appropriate. Other embodiments may include other processing modules in addition to those illustrated in FIG. 1, and/or may provide the various features and functions described herein using different (but equivalent) arrangements of processing modules and features, as desired.

Figure 3A:
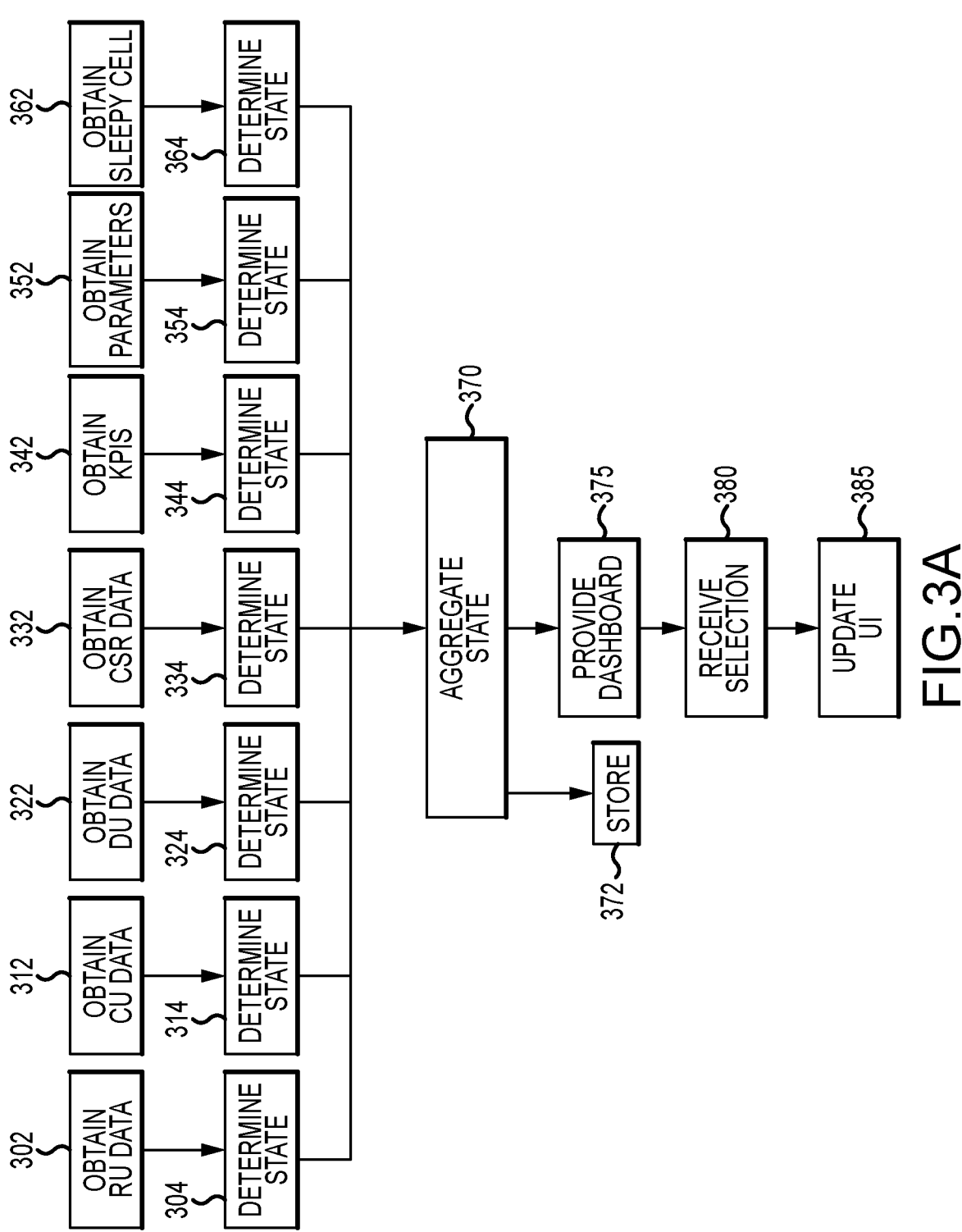
FIG. 3A is a flowchart illustrating an example of an automated process to determine a network status dashboard corresponding to a wireless network.
Figure 3B:
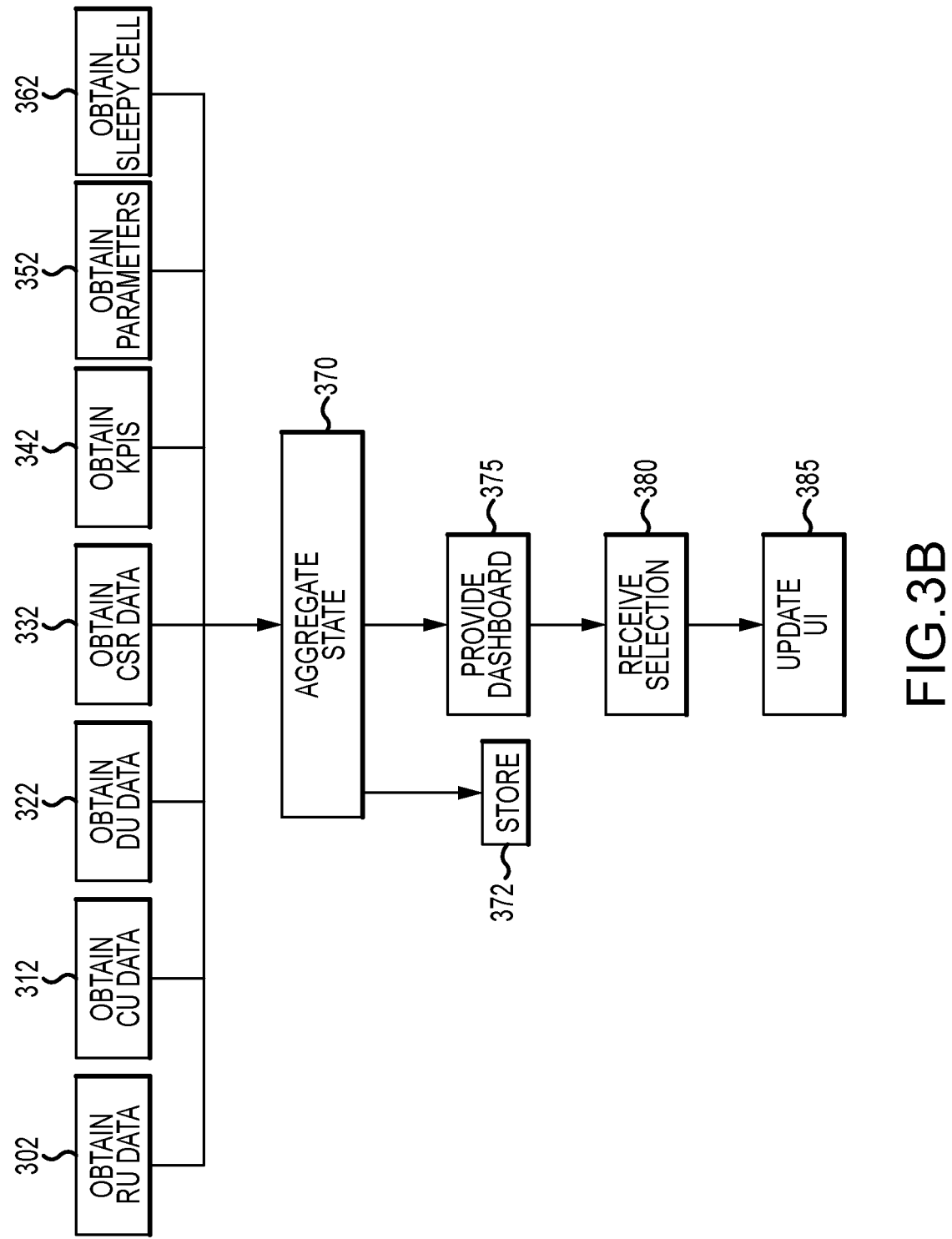
FIG. 3B is a flowchart illustrating another example of an automated process to determine a network status dashboard corresponding to a wireless network.

FIG. 3A is a flowchart illustrating one example of an automated process 300 performed by a data management system 140 and/or other components of a wireless network system 100 to provide a network status dashboard responsive to a user selection. FIG. 3B is a flowchart illustrating a variation 390 of the automated process performed by the data management system 140 and/or other components of a wireless network system 100 to provide a network status dashboard responsive to a user selection. The various functions shown in FIGS. 3A and 3B may be distributed amongst the various components of system 100 in any manner, and different embodiments may organize the processing of various features in any number of different ways. In some examples, the data management system 140 performs the data collection, processing, data storage, and reporting (e.g., via UI 158) functions.

Processes 300 and 390 suitably include the broad functions of obtaining and processing status data, determining a network status based on the obtained status data, generating a dashboard comprising an indication of the determined status, providing the dashboard to a user interface, receiving a user selection of a cell site or specific component associated with the cell site, and updating the user interface with status data corresponding to the user selection.

In some embodiments, the data management system 140 may use one or more machine learning (ML) models, or a MLM system having one or more machine learning models (MLMs) working in cooperation, each for example trained based on a machine learning algorithm, to ingest the obtained status data (e.g., perform status data embedding or other processing), embed dashboard queries, to format and generate responses to user selections within the dashboard, or the like. A ML algorithm may comprise a procedure run on a training data set to create a ML model, and a ML model may be configured to receive new input data and generate an estimation, prediction, classification, response, vector, or the like for the new input data. An ML model may also be referred to as an AI (artificial intelligence) model.

The MLMs or MLM system, which may include multiple MLMs and may be configured to use the MLMs in connection with each other (e.g., using supporting processes), may be stored in the memory of the data management system 140. The supporting processes may include, for example, automated routines to perform functions that facilitate providing input to and managing output from a MLM, including filtering, formatting, database 155 access, or the like. The MLM and/or MLM system may include an application programming interface (API) which may be used by the data management system 140 and/or the MLM system for transferring data, processing status data, user queries, output results, updating/retraining one or more MLMs, and the like. The data management system 140 processor may execute operating routines including the MLMs, and may generate actions and output based on one or more of the received status data, user selections, or the like. In some embodiments, the MLMs may comprise suitable ML models for creating vector embeddings from input data/queries (an embedding model), language models for understanding queries and formatting responses, or the like.

The ML algorithm(s) for the ML models discussed herein may be implemented on any suitable computing system. In some embodiments, the data management system 140 may be configured to perform the ML algorithm. In some embodiments, a separate computing system may be configured to perform the ML algorithm. The ML algorithm may be configured to construct and/or retrain a MLM based on the training data set. The training data set may comprise example inputs and their actual outputs (e.g., vector embedding, query and expected response, data types and expected output formatting, etc.). Some generated MLMs can map the inputs to the outputs based on the provided training set. The MLM may be updated over time, for example as the training data set becomes larger, is improved, as the number of requests and responses increases (e.g., with corresponding feedback), or is otherwise updated. As the network 102 evolves, the MLMs of the MLM system may be retrained from time to time to increase accuracy of the generated responses, to alter response format, to adapt to frequently chosen user selections, or the like. In some embodiments, the data management system 140 may be provided with the updated MLMs from time to time.

The ML algorithm may be configured to perform machine learning using various methods, such as decision tree learning, associates rule learning, artificial neural networks, deep learning, convolutional neural networks, recurrent artificial neural networks, long short term memory neural networks, inductive logic programming, support vector machines, clustering, random forest, Bayesian networks, reinforcement learning, supervised/unsupervised learning, representation learning, similarity and metric learning, sparse dictionary learning, genetic algorithms, k-nearest neighbor (KNN), among others.

As described above, the one or more ML algorithms are configured to perform a particular task, for example training a MLM to create a vector embedding for obtained status data and/or a user selection from the UI 158 (for retrieving closest or otherwise relevant results), determine a formatted human-readable response to a user selection based on retrieved data from the database, and the like. The tasks for which the MLMs are trained may vary based on, for example, the type of network 102, the number and type of network components, the anticipated amount of status data, predetermined fields for which status is to be provided, tradeoffs between accuracy and speed in determining output, and so on.

The MLM system may include any suitable MLM to process large quantities of past (historical) and/or present data and identify (classify, categorize, etc.) patterns in the data. In some embodiments, the MLM system may include a large language model (LLM) that can perform natural language processing tasks such as summarizing data and text and providing a response to a user selection on a dashboard, e.g., presented on UI 158, by generating a natural language or otherwise formatted response. In some embodiments, the MLM system may include an embedding model (EM) that converts status data (in its various forms) and user selections on a UI 158 dashboard into a numerical representation of the status data, for example vector(s) of numbers reflecting its semantic meaning and creating a unique identifier for a particular obtained status data. Exemplary embedding models may assign such identifiers to any type of status data, whether text, numerical data points, image, or the like. Embedding models may support a semantic search of the status data. The distance between vectors of status data and/or queries can measure the relationship between the various data and/or queries, and a similarity search may be performed on the vector store to find the closest results to an embedded (e.g., vectorized) user selection, for example.

As described above, the data management system 140 may obtain (e.g., receive) status data according to several different methods, for example by requesting it, receiving regular streamed data, via user upload, or the like. Referring back to FIG. 3A, the data management system 140 may perform an interactive dashboard process 300 which, in some embodiments, includes obtaining sets of status data for each of several components and aspects of the network 102. Components may include the RU, CU, DU, and so on, and aspects may include KPIs, parameters, sleepy cell information, or the like. Components and/or aspects of the network 102 may be referred to herein as network components.

In some embodiments, the data management system 140 may obtain a set of status data for the RU at step 302, for the CU at step 312, for the DU at step 322, for the CSR at step 332, for KPIs at step 342, and for network parameters at step 352. The interactive dashboard process 300 may include, at step 362, obtaining status data suitable for sleepy cell detection and/or the output of a process to detect sleepy cells.

The data management system 140 may, according to the interactive dashboard process 300, make determinations about the operational state of each of network component for which it obtained status data. The state determinations may be made using component check processes, which may include determining if the component is operating within expectations, has values within acceptable limits (whether predetermined, adjustable, reactive, relative, or otherwise), is not operating within expectations or acceptable limits, determining a percentage of optimal performance, or other suitable summary about the operation of the network components. In some embodiments, the data management system 140 may determine a state of the RU at step 304 based on the obtained RU status data 302, a state of the CU at step 314 based on the obtained CU status data 312, a state of the DU at step 324 based on the obtained DU status data 322, a state of the CSR at step 334 based on the obtained CSR status data 332, a state of the KPI at step 344 based on the obtained KPI status data 342, and a state of the parameters at step 354 based on the obtained parameter status data 352. The data management system 140 may, at step 364 and if it did not obtain a determination of sleepy cell at step 362, determine whether a cell site is a sleepy cell.

The component check processes (steps 304, 314, 324, 334, 344, 354, 364), which may be referred by as ingesting the status data, may include any suitable system or method for determining a state of the network component. Each network component (e.g., RU, DU, KPI, parameters, etc.) may use any suitable component check configured for that particular network component, and each component check process may include its own algorithm, checks, thresholds, MLMs, or the like. In some cases, a component check process may include comparing the obtained status data against thresholds/limits, checking a status indicator in the obtained status data, a more complex (e.g., multi-factor) interpretation of data, or the like. In some embodiments, a component check process may include anomaly detection such as isolation forest, random forest, time series analysis, or the like. In some embodiments, a component check process may include an MLM, for example trained to determine and output a state determination, such as a component status (e.g., binary decision of okay "OK" or not okay "NOK") or a list of issues, based on the obtained status data. Each component check process may store data relevant to the determination of the component state (e.g., value over threshold, status indicator from the obtained status data, status data relevant to a MLM determination, etc.) for later use by the data management system 140 (e.g., for use with a dashboard).

In some embodiments, a component check process may perform, at step 364, sleepy cell detection. Sleepy cell detection may include anomaly detection over time, for example applying a time series analysis with counters to identify abnormalities indicating a sleepy cell. Time series analysis may be used in some embodiments to determine other abnormal operating states of the cell site and/or other network components. In some embodiments, the component check process for sleepy cell detection 364 may include a MLM trained to determine sleepy cell status based on a plurality of obtained status data for relevant network components.

The steps of obtaining status data for network components and making state determinations for those components based on the obtained status data may be repeated for each individual component (e.g., each individual RU, DU, etc.) at or associated with a cell site, and for each cell site in the network 102. The data management system 140 may store the results of the steps of obtaining status data and making state determinations for later use in the interactive dashboard process 300, for example for providing a component status dashboard, for updating the dashboard based upon a user selection, or the like.

The data management system 140 may, at step 370, aggregate the various state determinations for each cell site, for example for displaying relevant status by cell site in a dashboard. For example, a cell site may comprise a plurality of RUs, and state determinations may be aggregated 370 for all RUs of the cell site such that if any of the RUs are failing, an RU field for that cell site will show an indication of such failure (e.g., "NOK," a red color, or the like) on a dashboard. State determination aggregation 370 may include determining an overall status for each cell site based on the individual state determinations for each network component associated with the cell site. For example, if a cell site has one associated network component (e.g., CU or DU) that is considered not okay ("NOK") by a network operator or otherwise not within expected or desired operating conditions, then the cell site itself may be indicated on a dashboard as sharing the same undesired status (e.g., "NOK").

In some embodiments, aggregation 370 may review state determinations such as binary decisions of okay/not okay and determine a component or cell site has all relevant components okay (or not okay if at least one relevant component reports not okay). In some embodiments, aggregation 370 may review an issues list generated by the component check process(es) and if the list is empty then determine the relevant component or cell site is okay (or not okay if there is at least one item on a corresponding issues list). In some embodiments, the output of the state determinations (steps 304, 314, 324, 334, 344, 354, 364) may perform respective aggregation of the respective network components (e.g., aggregating state determinations for each RU of the plurality of RUs at a cell site). In some embodiments, further aggregation by a determination aggregation step 370 may not be necessary.

Referring briefly to FIG. 3B, in some exemplary embodiments the aggregation step 370 of an interactive dashboard process 390 may directly receive one or more of the obtained status data from steps 302, 312, 322, 332, 342, 352, and/or 362 without it being operated upon by component check processes 304, 314, 324, 334, 344, 354, and/or 364. The aggregation step 370 may, in some embodiments, use thresholds, multi-factor determinations, and/or the like in determining an overall cell site status. The aggregation step 370 may, in some embodiments, use a MLM trained to determine an overall cell site status based on the plurality of obtained status data, and/or make determinations relevant to the operational states of the individual network components based on the obtained status data. For example, the MLM may be trained to provide one or more issues lists, identification of components leading to an undesirable operating state (failing or otherwise operating outside of predefined or otherwise expected thresholds, tolerances, limits, etc.), or the like.

The aggregation step 370 of process 390 may store relevant information (e.g., leading to the determined operational state) for later user, for example in database 155. The provided dashboard 375 may, in some interactive dashboard processes 390, be configured to focus on operational state(s) of the cell site as a whole. In some embodiments, an interactive dashboard process may use a combination of processes 300 and 390, for example performing component check processes on some obtained status data (e.g., for RU, DU, CU, CSR or other structural components of the network) and operating on other obtained status data directly in the aggregation step 370 (e.g., for KPI, parameters, sleepy cell, or the like). Other aspects of process 390 may be similar or the same as described herein with respect to process 300, for example steps related to the interactive dashboard, repeated collection and determination of operational state, and the like.

Referring to FIGS. 3A and 3B, at step 372, the data management system 140 may store, for example in database 155, the result of the determination aggregation step 370 for later use. As noted above, the data management system 140 may also store the obtained status data and the state determinations for later use, for example in database 155. Storing 372 the various information and results (output) may occur at one or more suitable times throughout process 300.

At step 375, the data management system 140 may provide a dashboard 400 indicating a status of the network 102. Providing the dashboard 400 may include generating the dashboard 400 and presenting the dashboard 400 via a user interface such as UI 158. In some embodiments, referring to FIG. 4A, the dashboard 400 may be generated to include overall status of each cell site as determined by the aggregation 370, along with status of relevant network components (RU, DU, KPI, etc.) as determined by the component check processes (steps 304, 314, 324, 334, 344, 354, 364) and/or the aggregation 370.

In some exemplary embodiments, the dashboard 400 may be configured in tabular format with cell sites listed in the vertical direction 410, and components associated with the cell site (DU, CU, RU, KPI, etc.) listed along the horizontal direction 420. The overall operational state of a cell site may be indicated, for example, by coloration of a cell site identifier 430 (e.g., green for a desirable condition, red for an undesirable condition) or other suitable indicator. The determined operational state 440 of each network component associated with each cell site may be indicated, for example, by a color indication, a good/bad determination (e.g., "OK" or "NOK"), or the like.

The data management system 140 may repeatedly perform the steps of obtaining status data 302 etc., component check processes 304 etc., aggregation 370, storing 372, and providing the dashboard 375 to continue updating the determined operational state of the network 102 and thereby the dashboard 400. For example, the data management system 140 may perform these steps every five minutes, every half hour, every hour, every day, and/or at any other suitable predetermined regular or irregular time period. In some embodiments, the data management system 140 may generate and store (e.g., in a database or other memory associated with database 155 or separate therefrom) a series of determined operational states, for later retrieval by an operator of the network system 100, for analyzing trends over time (which may be automated and may be interpreted by another MLM), or the like. In some embodiments, the data management system 140 may perform these steps upon receiving a trigger, for example an alarm, alert, or the like from any of the various network components, an update request from a user via the user interface, or the like.

The dashboard may be presented via a user interface, for example UI 158, where it may be interacted with by a user. The user may select (e.g., through a mouse click action or other suitable selection process) an item of the dashboard, such as one of the indicators of the determined state. For example, a dashboard 400 configured in a tabular format may be configured so that each cell (entry) of the table is selectable by a user. The user may select an entry corresponding to a network component for a particular cell site to retrieve relevant, and often more detailed, information relating to the status displayed in that entry. The user may select an entry containing a cell site identifier to retrieve relevant information relating to the overall status of the cell site. The data management system 140 may, at step 380, correspondingly receive an indication of the user selection in any suitable manner, for example via API call, HTTP protocols, function call, memory location update (e.g., updating a variable), network communication, or the like.

At step 385, the data management system 140 may update the user interface (e.g., UI 158) in response to the received user selection. In some embodiments, the data management system 140 may retrieve information relevant to the user selected determined state from the database 155, if such data is not already available to the user interface. In some embodiments, if the user selection comprises a cell site identifier, the data management system 140 may update the user interface to show all issues or other undesirable conditions corresponding to the selected sell cite.

Figure 4A:
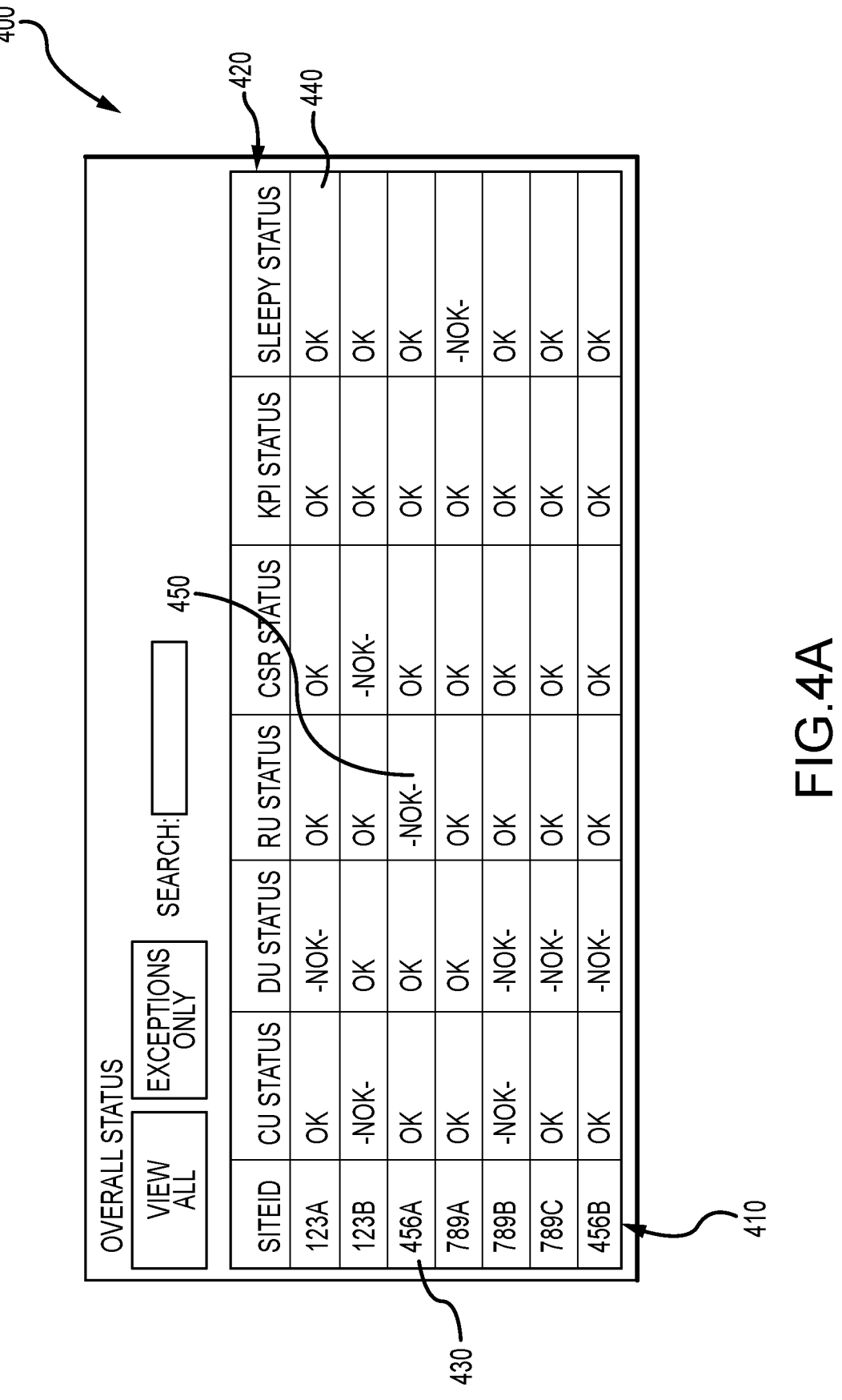
FIG. 4A is an example of an interactive network status dashboard.
Figure 4B:
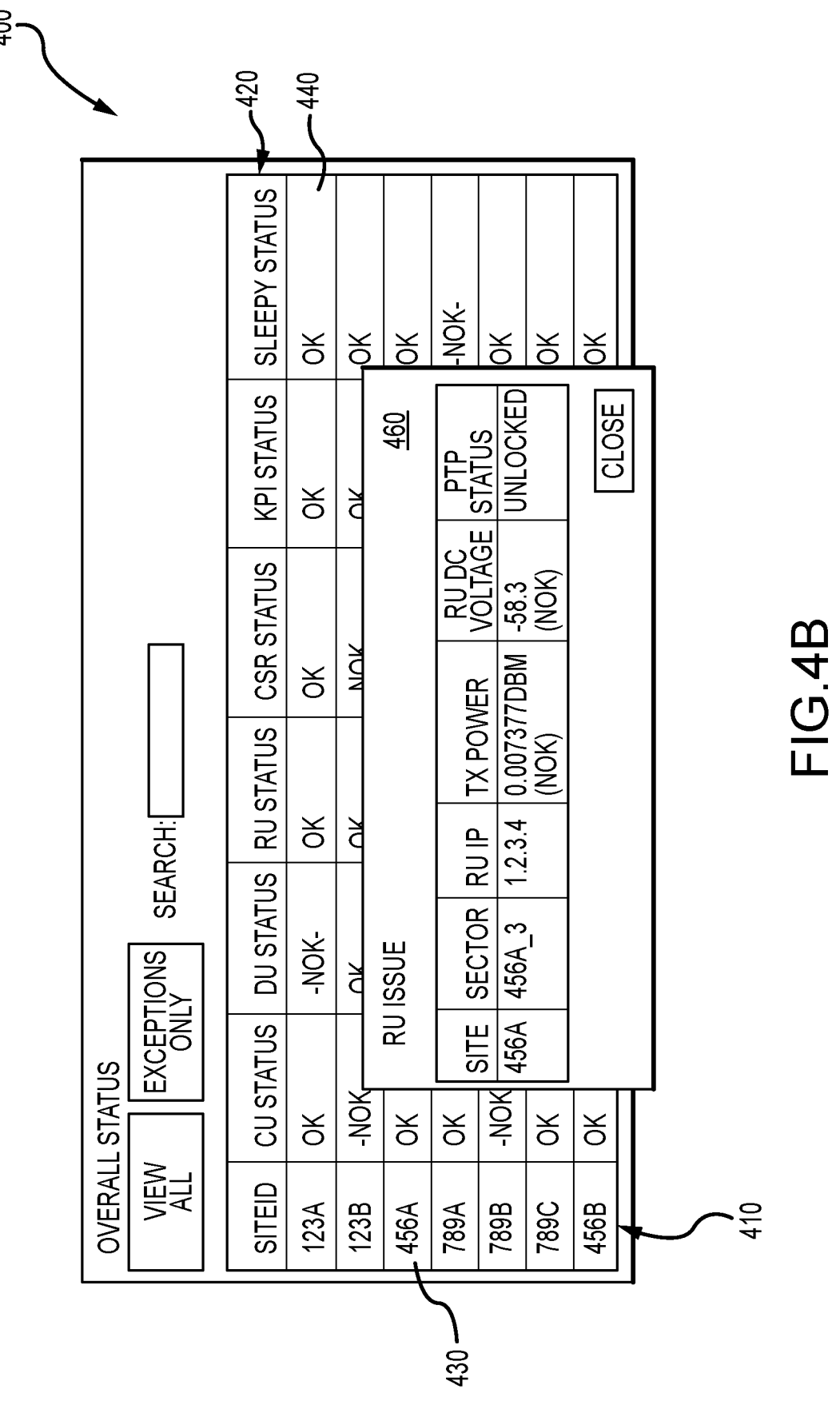
FIG. 4B is an example of an updated network status dashboard.

For example, if a user selects one of the "NOK" RU state identifiers 450 in the exemplary dashboard of FIG. 4A, the data management system 140 may provide to the UI 158 a display of the attribute(s) which are causing or otherwise related to the determined status of the selected component. The data management system 140 may retrieve obtained status data and/or other determined information such as determined issues lists relevant to the determined operational state of the selected RU, and may then provide an updated interface with the retrieved information, for example as shown in FIG. 4B. The updated interface may comprise the dashboard 400 with an overlay 460 displaying relevant identifying information (e.g., cell site, sector, IP address) and status data relevant to the determined state (e.g., reported power, voltage, etc.), may replace the dashboard 400, may otherwise augment the dashboard, or the like. In some embodiments, the data management system may provide such retrieved information in reports, alerts, notifications, electronic communication such as email or broadcast, or other suitable manner upon a user selection of a cell site or network component having an undesirable operating condition.

In some embodiments, the updated 385 user interface (e.g., overlay 460) may allow further user selection 380 of displayed information (status data, etc.) which may cause the data management system 140 to retrieve even more specific information related to the subsequent user selection and to further update 385 the user interface accordingly. In the example of FIG. 4B, a user may, in some embodiments, select the TX Power or RU DC Voltage values to receive further detailed information about these values, for example their values over a certain time period, their values relative to other components at the cell site or compared to other similar components in the network 102, or the like.

In some embodiments having one or more MLM component check processes, the user selection may be processed by the MLM or a separate MLM to identify the closest information relevant to the selected component/cell site and its determined state. For example, a component check process MLM may comprise an embedding model that embeds the obtained status data in a vector store, and the embedding model may be used to process the user selection to retrieve the closest relevant information from the vector store.

The disclosure herein is not limited to a tabular dashboard as described above, and other suitable configurations of dashboards, for example that allow a user to select an identifier of a determined component/cell state and receive additional relevant information related to identified determined stated, may be equivalently used.

Alerts (e.g., text message or email alerts) can be generated based upon one or more of the determined operating states or other important events occurring within network 102, and/or based upon any other factors. Any number of electronic outputs may be provided for display, publication and/or messaging, as desired. In some embodiments, the dashboard may be used to generate alerts, notifications, or the like.

Various embodiments therefore provide a data management system that can obtain and aggregate status data (in a variety of formats) regarding numerous aspects of a network 102 and its various components, determine operational states of many cell sites and associated network components, and generate appropriate and accurate dashboard summaries and additional information in response to user selections on the dashboard. In contrast to prior systems that were unable to process "big picture" or other unstructured analysis due to disparate types of status data and limited static and predefined dashboard reports, systems and methods as described herein permit much more sophisticated and flexible analysis and reporting than was previously available for such wireless networks. Systems and methods as described herein allow integration and analysis of a wide variety of relevant information not previously combinable for a 5G network. This allows for an efficient and complete understanding of network status, thereby improving timely identification and correction/prevention of issues, network functionality, and the like. Other embodiments may provide additional benefits and features, as desired.

Each of the various features and systems described herein may be implemented in software and/or firmware that resides in non-transitory data storage for execution by one or more processors to perform the various automated processes described herein.

The general concepts set forth herein may be adapted to any number of alternate but equivalent embodiments. The term "exemplary" is used herein to represent one example, instance or illustration that may have any number of alternates. Any implementation described herein as "exemplary" is not necessarily to be construed as preferred or advantageous over other implementations, nor is it necessarily intended as a model that must be duplicated in other implementations. While several exemplary embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of elements described without departing from the scope of the claims and their legal equivalents.

What is claimed is:

1. An automated process performed by a data management system associated with a wireless network having a plurality of network components associated with a plurality of cell sites, the data management system comprising a processor and an interface to the wireless network, the automated process comprising:

obtaining, via the network interface, a plurality of sets of status data wherein each set of status data corresponds to one of the plurality of network components, and wherein the plurality of network components comprises at least one each of a radio unit (RU), a distributed unit (DU), and a centralized unit (CU) associated with each of the plurality of cell sites;

determining an operational state for each of the plurality of network components based on the corresponding status data set;

aggregating each determined operational state associated with a first cell site of the plurality of cell sites to determine an operational state of the first cell site;

generating a dashboard comprising an indication of the operational state of the first cell site and an indication for each network component associated with the first cell site;

providing the dashboard to a user interface;

receiving a user selection corresponding to one of the determined operational states via the user interface; and providing a report comprising details regarding the corresponding determined operational state.

2. The automated process of claim 1, wherein determining an operational state for each of the plurality of network components further comprises detecting a sleepy cell.

3. The automated process of claim 1, comprising:

obtaining key performance indicators (KPIs) and a set of status data corresponding to a cell site router (CSR) associated with the first cell site; and determining an operational state for the KPIs and the CSR.

4. The automated process of claim 1, wherein the operational state for each of the plurality of network components is determined according to a machine learning model (MLM).

5. The automated process of claim 4, wherein the operational state for each of the plurality of network components is determined according to a plurality of machine learning models (MLMs), wherein each MLM is trained to determine the operational state of a corresponding one of the plurality of network components.

6. The automated process of claim 1, wherein the plurality of sets of status data are repeatedly obtained and the operational state for each of the plurality of network components are repeatedly determined at a predetermined time interval.

7. The automated process of claim 6, wherein the dashboard is updated based on the repeated determinations of operational states.

8. The automated process of claim 1, wherein:

the generated dashboard comprises user-selectable operational state indications; and the user selection comprises a selected one of the operational state indications.

9. The automated process of claim 1, wherein:

performing aggregation comprises aggregating each determined operational state associated with each cell site of the plurality of cell sites to determine an operational state for each of the plurality of cell sites; and the generated dashboard comprises an indication of the operational state of each of the plurality of cell sites and an indication of the operational state of each network component associated with each of the plurality of cell sites.

10. A data management system comprising a processor, non-transitory storage, and an interface to a wireless network having a plurality of network components associated with a plurality of cell sites, wherein the non-transitory storage comprises computer-executable instructions that, when executed by the processor, perform an automated process that comprises:

obtaining, via the network interface, a plurality of sets of status data wherein each set of status data corresponds to one of the plurality of network components, and wherein the plurality of network components comprises at least one each of a radio unit (RU), a distributed unit (DU), and a centralized unit (CU) associated with each of the plurality of cell sites;

determining an operational state for each of the plurality of network components based on the corresponding status data set;

aggregating each determined operational state associated with a first cell site of the plurality of cell sites to determine an operational state of the first cell site;

generating a dashboard comprising an indication of the operational state of the first cell site and an indication for each network component associated with the first cell site;

providing the dashboard to a user interface;

receiving a user selection corresponding to one of the determined operational states via the user interface; and providing a report comprising details regarding the corresponding determined operational state.

11. The data management system of claim 10, wherein determining an operational state for each of the plurality of network components further comprises detecting a sleepy cell.

12. The data management system of claim 10, wherein the automated process further comprises:

obtaining key performance indicators (KPIs) and a set of status data corresponding to a cell site router (CSR) associated with the first cell site; and determining an operational state for the KPIs and the CSR.

13. The data management system of claim 10, wherein the operational state for each of the plurality of network components is determined according to a machine learning model (MLM).

14. The data management system of claim 13, wherein the operational state for each of the plurality of network components is determined according to a plurality of machine learning models (MLMs) stored in the non-transitory storage, wherein each MLM is trained to determine the operational state of a corresponding one of the plurality of network components.

15. The data management system of claim 10, wherein the automated process further comprises repeatedly obtaining the plurality of sets of status data and repeatedly determining the operational state for each of the plurality of network components, at a predetermined time interval.

16. The data management system of claim 15, wherein the automated process further comprises updating the dashboard based on the repeated determinations of operational states.

17. The data management system of claim 10, wherein:

the generated dashboard comprises user-selectable operational state indications; and the user selection comprises a selected one of the operational state indications.

18. The data management system of claim 10, wherein:

performing aggregation comprises aggregating each determined operational state associated with each cell site of the plurality of cell sites to determine an operational state for each of the plurality of cell sites; and the generated dashboard comprises an indication of the operational state of each of the plurality of cell sites and an indication of the operation state of each network component associated with each of the plurality of cell sites.

19. An automated process performed by a data management system associated with a wireless network having a plurality of network components associated with a plurality of cell sites, the data management system comprising a processor and an interface to the wireless network, the automated process comprising:

obtaining, via the network interface, a plurality of sets of status data wherein each set of status data corresponds to one of the plurality of network components, and wherein the plurality of network components comprises at least one each of a radio unit (RU), a distributed unit (DU), and a centralized unit (CU) associated with each of the plurality of cell sites;

aggregating, for each cell site of the plurality of cell sites, a subset of the plurality of sets of status data associated with the respective cell site;

determining, based on the aggregated subsets of status data, an operational state of each of the plurality of cell sites;

generating a dashboard comprising an indication of the operational state of each of the plurality of cell sites;

providing the dashboard to a user interface;

receiving a user selection corresponding to one of the determined operational states via the user interface; and providing a report comprising details regarding the corresponding determined operational state.

20. The automated process of claim 19, further comprising:

determining, using a machine learning model (MLM) and for each cell site of the plurality of cell sites, a list of issues wherein each list of issues corresponds to network components associated with the respective cell site, and wherein the MLM determination of each list is based on the aggregated subset of status data associated with the respective cell site; and determining, based on each list of issues, an operational state of the network components associated with the respective cell site, wherein generating the dashboard comprises providing an indication of the determined operational state of each network component.

\* \* \* \* \*